(12) United States Patent
Helfrick et al.

(10) Patent No.: US 7,940,508 B2
(45) Date of Patent: May 10, 2011

(54) INHERENTLY SAFE MODULAR CONTROL SYSTEM

(75) Inventors: Brenton Eugene Helfrick, Middletown, PA (US); Aaron Richard Kreider, Elizabethtown, PA (US); Brian James Vogt, Harrisburg, PA (US); Davis Mathews, Lewisberry, PA (US)

(73) Assignee: Phoenix Contact Development & Manufacturing, Inc., Middletown, PA (US)

( * ) Notice: Subject to any disclaimer, the term of this patent is extended or adjusted under 35 U.S.C. 154(b) by 134 days.

(21) Appl. No.: 12/549,474

(22) Filed: Aug. 28, 2009

(65) Prior Publication Data

US 2010/0222936 A1    Sep. 2, 2010

Related U.S. Application Data

(60) Provisional application No. 61/093,239, filed on Aug. 29, 2008.

(51) Int. Cl.
 *H02H 3/00* (2006.01)

(52) U.S. Cl. .......................................... 361/119; 361/62

(58) Field of Classification Search .................... 361/62, 361/66, 68, 119
See application file for complete search history.

(56) References Cited

U.S. PATENT DOCUMENTS

| 6,275,881 | B1 | 8/2001 | Doege et al. |
| 6,700,477 | B2 | 3/2004 | Schwarz et al. |
| 2005/0068710 | A1 | 3/2005 | Burr et al. |
| 2007/0298638 | A1* | 12/2007 | Kojori .......................... 439/181 |
| 2008/0013226 | A1 | 1/2008 | Kirst |

FOREIGN PATENT DOCUMENTS

| EP | 1885085 A1 | 2/2008 |
| WO | 9204813 A1 | 3/1992 |
| WO | 2007010289 A1 | 1/2007 |

* cited by examiner

*Primary Examiner* — Danny Nguyen
(74) *Attorney, Agent, or Firm* — Hooker & Habib, P.C.

(57) ABSTRACT

A modular system for transmitting power and data between a control processor that receives and transmits signals along a trunk of a distributed control network, and one or more field devices located in a hazardous area includes a backplane bus and a trunk module connected to the backplane and interconnecting the trunk and backplane. Intrinsically safe spur modules are removably attached to the backplane.

12 Claims, 2 Drawing Sheets

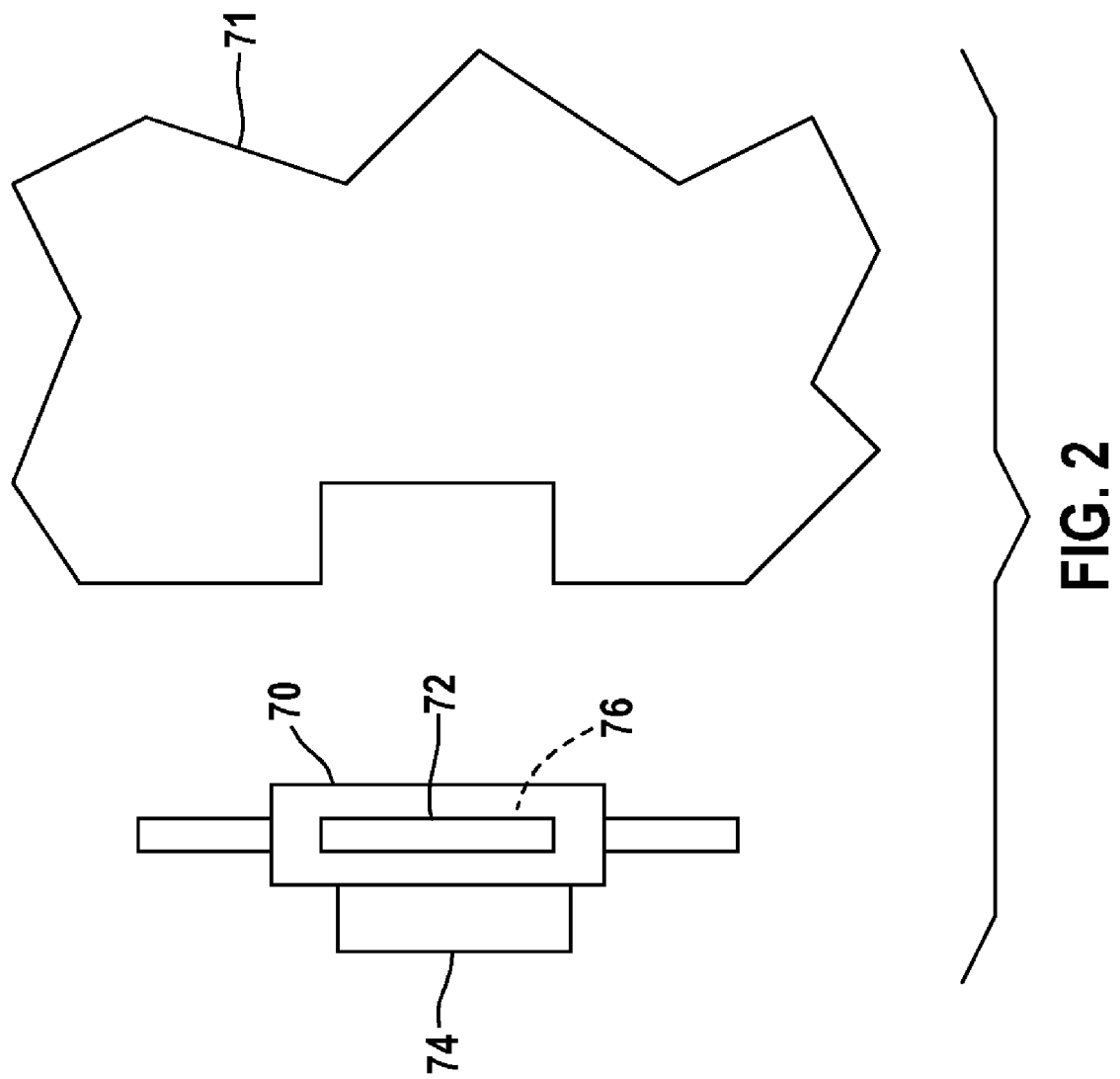

INHERENTLY SAFE MODULAR CONTROL SYSTEM

FIELD OF THE INVENTION

The invention relates to a control system for real-time distributed control, and more specifically, to a control system that provides an inherently safe interface between a main trunk and field devices of the control system.

BACKGROUND OF THE INVENTION

Automated industrial systems have field devices that monitor, control, and operate an industrial process. The field devices communicate with a control processor through a trunk that transmits power to the field devices and transmits data signals (which can include operating commands) between the control processor and the field devices. The field devices each attach to the trunk via a spur or branch connection. The field devices can be distributed throughout the industrial plant, and the data transmittal rates allow essentially real-time control of the process.

Standardized power and communication protocols have been developed for distributed control systems. For example, the Foundation Fieldbus protocol is an all-digital, serial, two-way communication system that sends DC power and signals over a twisted two-wire trunk cable and enables the control processor to communicate with and control a number of field devices. Other known distributed control systems include the Profibus PA and Ethernet-based control systems.

Field devices may be located in hazardous areas of the plant that present the risk of fire. Hazardous areas are identified by class as to the nature of the risk. Flammable gases are in Class 1 areas, combustible dusts are in Class 2 areas, and ignitable fibers and flyings are in Class 3 areas. Class 0 is a safe area without fire risk.

Hazardous areas are further identified by division and zone as to the level of fire risk. Division 1 identifies areas in which the fire risk is a continuous presence (Zone 0) or in which the fire risk is present only during normal operations (Zone 1). Division 2 identifies hazardous areas in which the fire risk is not expected (Zone 2), but if the risk does occur it is present for only a short period of time.

Distributed control systems having field devices located in hazardous areas may be intrinsically safe. Intrinsically safe control systems are designed so that the energy released during an electrical fault is insufficient to cause ignition within the hazardous area. The voltages and currents in the entire control system are reduced to limit the energy release to below the ignition point.

The problem with an intrinsically safe control system is that the limited power available in the system may be insufficient to operate all the field devices in the system, including those in safe areas.

Other control system approaches have been developed that provide sufficient power to operate all field devices, while still providing intrinsic safety for field devices in hazardous areas.

In the entity approach, safety barriers are provided when transitioning from a safe area to a hazardous area. The barrier provides a limited number of spurs that extend into the hazardous area, and limits the amount of current available to the spurs. The limited current limits the number of field devices that can be attached downstream from the safety barrier. For many industrial plants, providing and connecting a large number of separate and discrete safety barriers is expensive and takes up much valuable space.

In the FISCO approach (developed for fieldbus), the system is looked at as a whole. Every part of the system, including specialized power supplies and connections, has to satisfy strict limits. FISCO solutions also require engineering analysis, and so tend to be expensive and complex.

Thus there is a need for an improved interconnectivity approach to control systems that enables the control system to provide sufficient power to operate all field devices while still providing intrinsic safety for field devices in hazardous areas, without discrete safety barriers or specialized power supplies or connections.

BRIEF SUMMARY OF THE INVENTION

The invention embodies an improved interconnectivity approach to control systems that enables the control system to provide sufficient power to operate all field devices while still providing intrinsic safety for field devices in hazardous areas, without discrete safety barriers or specialized power supplies or connections.

The invention is a modular interconnection system for transmitting power and data between a control processor that receives and transmits signals along a trunk of a distributed control network, and one or more field devices located in a hazardous area. The interconnection system includes a local bus defining a backplane, a trunk module connected to the backplane, and one or more field modules attached to the backplane.

The backplane carries power and data lines. For a Foundation Fieldbus compatible interconnection system, the backplane includes two conductors that carry both power and data. Each of the one or more field modules includes a backplane interface that connects the field module to the backplane, a field device interface to operatively connect a field device to the field module, and an intrinsically safe connection between the field device interface and the backplane interface transmitting power and data between the backplane interface and the field device interface.

The trunk module includes a trunk interface that connects the coupling module to the trunk of the distributed control network, a backplane interface that connects the coupling module to the backplane, and a connection between the trunk interface and the backplane interface transmitting power from the network interface to the backplane and transmitting data between the network interface and the backplane whereby power is transmitted from the network to the field devices through the backplane and data signals are transmitted between the control processor and the field devices through the backplane.

In a preferred embodiment of the invention, the backplane is a segmented backplane. The backplane lengthens as needed when additional field modules are added to the system.

The use of a backplane provides a number of advantages. Field modules can be easily added, without the need to add discrete safety barriers and without the need for additional engineering analysis. Field modules using different types of isolation circuits can be attached to the backplane for field devices located in different classes or divisions of hazardous areas. The trunk line can make full power available to modules connected to the backplane, and so additional modules can be added without intrinsic safety to deliver full power to field devices in safe areas. Additional types of devices can be connected to the backplane and interact with the control system.

Other objects and features of the invention will become apparent as the description proceeds, especially when taken

BRIEF DESCRIPTION OF THE DRAWINGS

FIG. 2 illustrates a backplane segment and a module portion attachable to the backplane segment.

DESCRIPTION OF THE PREFERRED EMBODIMENT

Figure 1:
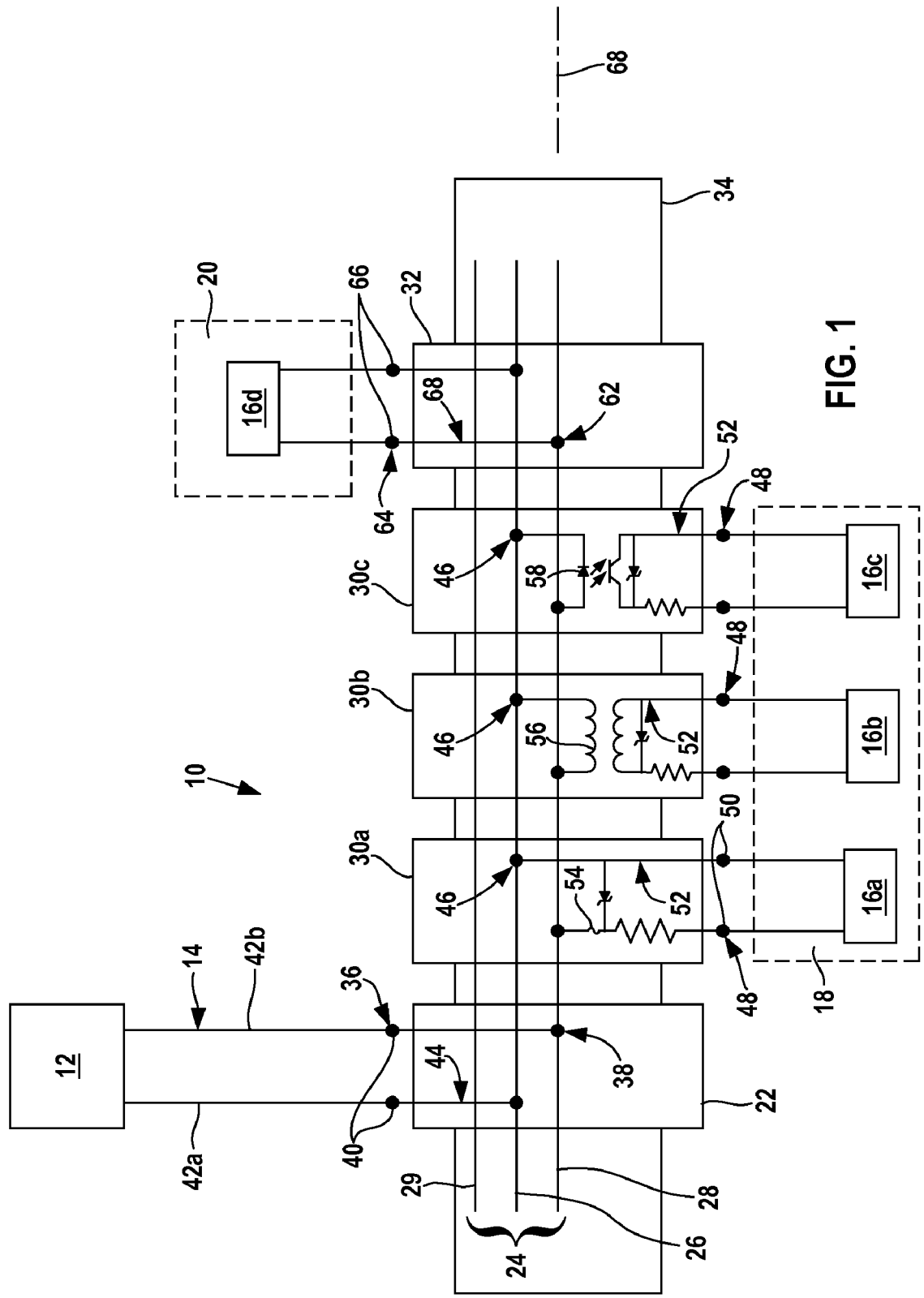
FIG. 1 illustrates a modular control system in accordance with the present invention connected to a control processor by a trunk.

FIG. 1 illustrates a modular control system 10 for transmitting power and data between a control processor 12 that receives and transmits signals along trunk 14 and field devices 16a, 16b, 16c, and 16d. Each field device 16a-c is located in a hazardous area 18. Field device 16d is located in a safe area 20. The illustrated control system 10 is a fieldbus system.

Although the trunk 14 is shown extending directly from the control processor 12 to the control system 10, there may be other device couplers (not shown) or other control systems similar to control system 10 located downstream from the control system 10 or located along the trunk 14 between the control processor 12 and the control system 10. Other network topologies may also be used.

The control system 10 is connected between the trunk 14 and the field devices 16 and transmits power from the trunk 14 to the field devices 16 and transmits data signals between the trunk 14 and the field devices 16. The field devices 16 may be process controllers, measurement devices, and the like as is well known in the art.

The control system 10 includes a trunk module 22 that connects the system 10 to the trunk 14. The trunk module 22 is connected to a local bus or backplane 24. The illustrated backplane 24 is fieldbus compatible, using two lines, "+" and "−" lines 26, 28 respectively, to conduct both DC power from the trunk module 22 along the backplane 24 and AC data signals to and from the trunk module 22 along the backplane 24. The backplane 24 also includes a shield line 29.

Attached to the backplane 24 are a number of field modules 30a, 30b, and 30c. Each field module 30 forms an intrinsically safe connection to a respective field device 16 located in the hazardous area 18. Also attached to the backplane 24 is an additional field module 32 that forms a non-intrinsically safe connection to the field device 16d located in the safe zone 20.

The illustrated modules 22, 30, and 32 are removably mounted on an elongate support or rail 34 that is preferably located in a control cabinet or other enclosure. For clarity the trunk module 22 and field modules 30, 32 are drawn spaced apart in FIG. 1, but it should be understood that the modules are preferably arranged immediately side-by-side of one another to conserve space within the cabinet.

The trunk module 22 includes a trunk interface 36 that connects the trunk module 22 to the trunk 14 and a backplane interface 38 that connects the trunk module 22 to the backplane 24. The illustrated trunk interface 36 includes a set or pair of terminals 40 that are connected to respective wires 42a, 42b of the fieldbus trunk 14. A connection 44 between the interfaces 36, 38 transmit power from the trunk 14 through the trunk interface 32 to the backplane lines 26, 28 and transmits data to or from the trunk 14 through the trunk interface 32 and the backplane lines 26, 28.

Each field module 30 includes a local bus interface 46 that connects the field module 30 to the backplane 24 and a field device interface 48 that connects a field device to the field module 30. The illustrated field device interface 48 includes a set or pair of terminals 50 that are connected to respective wires extending to the field device for data and power transmittal. The illustrated field modules 30 are intended to be "single spur" devices, that is, each field module 30 connects to a single field device. A connection 52 between the interfaces 46, 48 provide an intrinsically safe connection between the two interfaces 46, 48 as will be explained in greater detail below. The intrinsically safe connection 52 effectively isolates a connected field device from the trunk 14 for use of the field device in a hazardous area.

Each of the illustrated field modules 30a, 30b, and 30c includes a different type of intrinsically safe connection 52.

Field device 30a has an energy-limiting connection 52 that includes a fuse 54.

The field device 30b has a magnetic isolation connection 52 that magnetically couples the backplane and device interfaces 46, 48 using coupled inductance 56 (a passive component such as a transformer) or optionally an active-circuit equivalent simulating coupled inductance. An example of such an active circuit that can be adapted for this purpose is disclosed in Mittel U.S. Pat. No. 5,093,642 "Solid State Mutually Coupled Inductor" incorporated by reference as if fully set forth herein.

The field device 30c has an optical isolation connection 52 incorporating an optical isolator 58. If desired, the device interface of the optically-isolated field device 30c can be configured to connect with fiber optic cable that extends to the field device for data signal transmission. Separate power leads can be provided that extends from the device interface 48 to the field device or the field device can be powered independently and not through the backplane 24.

The additional field module 32 connects the backplane 24 with a field device located in a safe area. The field module 32 includes a backplane interface 62 that connects the field module to the backplane 24 and a field device interface 64 that connects a field device to the field module 30. The illustrated field device interface 64 includes a set or pair of terminals 66 that are connected to respective wires extending to the field device for data and power transmission. Preferably a segment protector 68 is located between the interfaces 62, 64. An example of a modular segment protector that can be adapted for this purpose is disclosed in Kitchener, WIPO International Publication Number WO2007/010289 "Modular Fieldbus Segment Protector".

Segment protectors can also be provided for the energy limited modules if desired.

The illustrated field module 32 is a "single spur" device, that is, the field module 32 connects to a single field device. Alternatively, the field module 32 can be a "multiple spur" device that can connect with two, three, four, or perhaps more field devices. Each device should be protected with its own respective segment protector.

It should be understood that the number of intrinsically safe field modules 30 and non-intrinsically safe field modules 32 connected to the local bus 24 can differ from that shown in FIG. 1 to connect the trunk 14 to more or less field devices 16.

An advantage of the control system 10 is that both intrinsically-safe field modules 30 and non-intrinsically-safe field modules 32 can be attached to the backplane 24 at the same time and in different numbers as needed. Other types of modules, such as backplane mountable field devices (not shown), can be added to the backplane 24 to communicate along the backplane 24 or with the trunk 14 through the trunk module 22.

The trunk module 22, the intrinsically-safe field modules 30 and the non-intrinsically safe field modules 32 are preferably designed to resist and prevent sparking due to voltage creep between the field device interface 48 of an intrinsically safe field module 30 and either the trunk interface of the trunk module 22 or the field device interface 64 of a non-intrinsically safe field module 32.

As seen in FIG. 1, the trunk module 22 and the field modules 30, 32 are arranged in a side-by-side layout and extend along a horizontal axis 68 defined by the rail 34. The set of terminals 40 of the trunk module 22 and each set of terminals 66 of a non-intrinsically safe field module 32 is located on upper vertical ends of the trunk module 22 or the field module 32. The set of terminals 50 of an intrinsically safe field modules 30 is located on the vertical lower end of the field module 32. Thus even if an intrinsically safe module 30 is sandwiched between two non-intrinsically safe field modules 32, or if the module 30 is sandwiched between a trunk module 22 and a non-intrinsically safe field module 32, the intrinsically-safe terminals 50 are spaced away from the non-intrinsically-safe terminals 40 and 66.

The backplane 24 can be an elongate printed circuit board, or can be formed as conductors that extend along the rail 34.

In a preferred embodiment, the backplane 24 is formed as separable bus segments 70. See FIG. 2, which illustrates a backplane segment 70 and part of a housing portion 71 of a module 22, 30, or 36 attachable to the backplane segment 70. The backplane segment 70 snaps on the rail 34. Each backplane segment 70 includes a length of the backplane bus 24 and a connector 72 that forms part of the backplane interface for the trunk module 22 or field module 30, 32 to be attached to the backplane segment. Backplane bus connections 74 and 76 are located on one side and the bottom of the backplane segment 70. Backplane segments 70 are snapped on the rail 34 and pushed together to connect adjacent bus connectors and form the backplane 24 extending the length of the attached segments 70. Removing the housing portion 71 of a field module 30, 32 attached to the backplane segment leaves the segment 70 left behind on the rail 34 interconnected with adjacent segments, with the backplane 24 and the remaining modules intact and operational.

A new module can be added to the system 10 by snapping a backplane segment 70 on the rail 34, pushing the added segment against the other backplane segments, and attaching the housing 71 of the module to the added backplane segment. The housing portion 71 includes the mating portion of the backplane interface and the remaining components of the module.

A commercially available segmented backplane 70 that can be adapted for use in the present invention is the T-BUS (trademark) modular rail bus manufactured by Phoenix Contact, assignee of the present invention.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. A modular interconnection system for transmitting power and data between a control processor that receives and transmits signals along a trunk of a distributed control network and one or more field devices located in a hazardous area, the system comprising:

a backplane, a trunk module connected to the backplane, and one or more field modules attached to the backplane;

the backplane comprising a data line that carries a data signal along the backplane and a power line that carries power along the backplane;

each of the one or more field modules comprising a backplane interface that connects the field module to the backplane, a field device interface to operatively connect a field device to the field module, an intrinsically safe connection between the field device interface and the backplane interface transmitting power from the backplane interface to the field device interface and transmitting data between the backplane interface and the field device interface;

the trunk module comprising a trunk interface that connects the trunk module to the trunk of the distributed control network, a backplane interface that connects the coupling module to the backplane, and a connection between the network interface and the backplane interface transmitting power from the network interface to the backplane power line and transmitting data between the network interface and the backplane data line whereby power is transmitted from the network to the field devices through the backplane and data signals are transmitted between the control processor and the field devices through the backplane.

2. The modular system of claim 1 wherein the trunk interface is a Fieldbus trunk interface.

3. The modular system of claim 1 wherein the trunk module and each of the one or more field modules has opposed sides, the trunk module and the one or more field modules being arranged in side-by-side order and extending along a first axis.

4. The modular system of claim 1 wherein the trunk module trunk interface comprises a set of terminals to connect the trunk module to the trunk and the field device interface of each of the one or more field modules comprises a set of terminals to connect such field module to a field device; and the set of trunk module terminals are spaced from the set of field module terminals along a second axis perpendicular to the first axis.

5. The modular system of claim 1 wherein the trunk module and each of the one or more field modules are mounted on a common rail.

6. The modular system of claim 1 wherein the backplane is a T-BUS.

7. The modular system of claim 1 wherein the backplane data line and the backplane power line comprises a common set of two lines that conduct both power and data.

8. The modular system of claim 1 comprising an additional module, the additional module comprising a backplane interface that connects the additional module to the backplane.

9. The modular system of claim 1 comprising one or more additional field modules to connect one or more additional field devices located in a safe area, each additional field module comprising a backplane interface that connects the additional field module to the backplane, a field device interface to operatively connect a field device to the field module, a non-intrinsically safe connection between the field device interface and the backplane interface transmitting power from the backplane interface to the field device interface and transmitting data between the backplane interface and the field device interface.

10. The modular system of claim 1 wherein each of the one or more field modules includes a segment protector.

11. The modular system of claim 1 wherein the trunk module and the one or more field modules each includes a backplane segment and a connector for connecting the backplane segment to an adjacent backplane segment whereby the backplane is extended by adding additional field modules to the system.

12. The modular system of claim 1 wherein the intrinsically safe connection between the field device interface and the backplane interface of each of the one or more field devices comprises at least one of the following: a power-limiting circuit, a magnetic isolation circuit, and an optical isolation circuit.

* * * * *